United States Patent [19]
Weis et al.

[11] Patent Number: 5,544,226
[45] Date of Patent: Aug. 6, 1996

[54] PRIVATE BRANCH EXCHANGE HAVING A CENTRAL CONTROL UNIT AND A MOBILE CONTROL UNIT SUBORDINATE THERETO

[75] Inventors: Bernd Weis, Korntal; Karl-Albert Turban, Leonberg; Monika Bezler, Stuttgart; Manfred Schulz, Hemmingen; Gerd Siegmund, Stuttgart, all of Germany

[73] Assignee: Alcatel N.V., Netherlands

[21] Appl. No.: 526,354

[22] Filed: Sep. 11, 1995

Related U.S. Application Data

[63] Continuation of Ser. No. 936,894, Aug. 19, 1992, abandoned.

[30] Foreign Application Priority Data

Aug. 30, 1991 [DE] Germany .................. 41 28 811.4

[51] Int. Cl.$^6$ ...................................... H04Q 7/26
[52] U.S. Cl. ............................. 379/61; 379/58
[58] Field of Search .................. 379/58, 59, 60, 379/61, 63, 242, 243, 244, 90, 92, 93, 62; 370/60.1, 94.1, 94.2, 110.1

[56] References Cited

U.S. PATENT DOCUMENTS

| | | | |
|---|---|---|---|
| 4,843,622 | 6/1989 | Yotsutani et al. | 379/63 |
| 4,905,237 | 2/1990 | Voelzke | 370/110.1 |
| 5,090,051 | 2/1992 | Muppidi et al. | 379/61 |
| 5,157,710 | 10/1992 | Itoh | 379/58 |

FOREIGN PATENT DOCUMENTS

| | | |
|---|---|---|
| 0408024 | 1/1991 | European Pat. Off. . |
| 9012469 | 10/1990 | WIPO . |

OTHER PUBLICATIONS

Airwaves, architecture and tomorrow's PABX, by Douglas Postlethwaite, "Communications International," May, 1990. pp. 59–67.

Communitation et Transmission Bd 7, Nr. 2, 1985, Paris Fr. Seiten 39–50 Cueugniet und Duplessis Radiocom 2000 Reseau multiserve de radiotelephonie Seite 43 mittlere Spalte–Seite 44.

"A Business Cordless PABX Telephone System on 8800 MH2 Based on the Dect Technology" by Colin Buckingham et al *IEEE Communications Magazine*, Jan. 1991.

*Primary Examiner*—Curtis Kuntz
*Assistant Examiner*—Michael B. Chernoff
*Attorney, Agent, or Firm*—Ware, Fressola, Van Der Sluys & Adolphson

[57] ABSTRACT

A private branch exchange (PABX) with an integrated mobile part for controlling cordless terminals (HS) is established, which can be operated from base stations (BS).

The private branch exchange (PABX) contains freely configurable interface modules (I/F) for wired (DE) and cordless (HS) terminals, which can be operated from a base station (BS). A central control unit (PABX-CPU) is provided to control all call handling and service feature control tasks, and a subordinate control unit (Mobile-CPU) for call setup and switch-off control of the cordless terminals (HS) in accordance with a set of assigned call numbers. The control units (PABX-CPU, Mobile-CPU) and the interface modules (I/F) are connected with each other through a bus system (BUS).

13 Claims, 1 Drawing Sheet

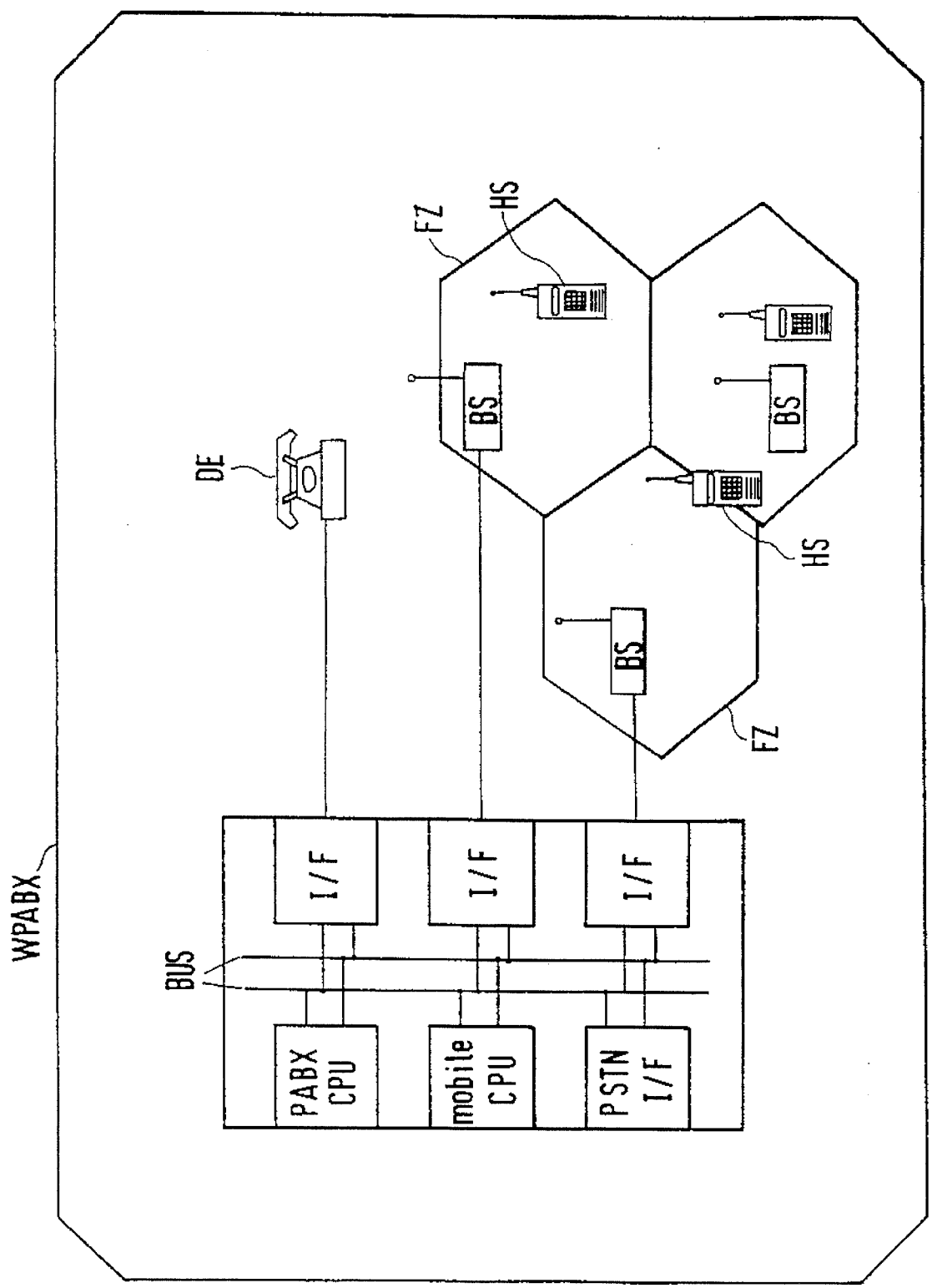

ns5,544,226

PRIVATE BRANCH EXCHANGE HAVING A CENTRAL CONTROL UNIT AND A MOBILE CONTROL UNIT SUBORDINATE THERETO

This is a continuation of application Ser. No. 07/936,894 filed on Aug. 27, 1992 now abandoned.

TECHNICAL FIELD

The present invention relates to wireless private branch exchanges (WPABX).

BACKGROUND OF THE INVENTION

Today, the direction of development in the area of mobile communications shows possibilities of operating cordless terminals from private branch exchanges as well. Such known wireless private branch exchanges (WPABX=Wireless Private Automatic Branch Exchanges) ("Airwaves, architecture and tomorrow's PABX", by Douglas Postlethwaite, Communications International, May 1990, p. 59–67) consist of a known private branch exchange to which wired terminals are connected as well. In its simplest configuration, the private branch exchange has one base station per radio cell, which is connected to the private branch exchange.

Comfortable configurations have a unit (RBX) performing a specified (also called "add-on") call handling function to control several base stations.

Thus, the indicated wireless private branch exchanges always consist of two independent parts, where the "mobile" part, like another subscriber as seen from the known private branch exchange, is connected to analog or digital line interfaces of the known private branch exchange.

The invention now has the task of creating a private branch exchange with an integrated mobile part.

The task is fulfilled by a private branch exchange comprising a plurality of interface modules configured for interfacing for connecting a plurality of terminals by wire and for connecting at least one base station which serves a radio cell and is connectable via an air interface to a plurality of cordless terminals, a central control unit for call handling and service-feature control in the private branch exchange, a control unit subordinate to the central control unit for processing all call-setup and -cleardown messages for a predetermined set of call numbers assigned to the cordless terminals, and a bus system to which are connected the central control unit, the subordinate control unit and the interface modules for exchanging control messages and executing switching tasks.

The availability of interface modules configured for interfacing for wired and wireless terminals, and the distribution of the control in such a way, that call handling and service feature control tasks are performed by a central control unit, and all call setup and switch-off controls for the cordless terminals are performed by a subordinate control unit, result in an integrated solution for a private branch exchange, which can control wired as well as cordless terminals with all the service features of the private branch exchange.

Since the subordinate control unit processes a specified set of call numbers that is assigned to the cordless terminals, the interface modules can be configured as ISDN-$S_0$ interfaces, where a transfer in protocol from ISDN (Integrated Services Digital Network) to DECT (Digital European Cordless Telephone) for the cordless terminals only takes place in the assigned base station. This is important, because the ISDN- protocol can only process call numbers, so that the private branch exchange must only operate with the ISDN-protocol. This means that already existing ISDN-capable private branch exchanges can be directly used.

Thus, on the one hand, the cordless terminals can use all the service features defined in the ISDN, on the other hand however, they operate according to the DECT-protocol, so that all cordless terminals operating according to the DECT-protocol can be used, regardless of the manufacturer.

Other advantageous configurations of the subject of the invention include a private branch exchange comprising an ISDN $S_0$ interface module (ISDN=Integrated Services Digital Network) for connecting at least one base station to make all ISDN service features available to the cordless terminals via the base station; a private branch exchange wherein the base station connected to the ISDN $S_0$ interface module performs an ISDN-DECT protocol conversion (ISDN=Integrated Services Digital Network, DECT=Digital European Cordless Telephone), so that the cordless terminals connectable to the base station via the air interface are operable in accordance with DECT protocols; a private branch exchange wherein the subordinate control unit controls an associated terminal identification in accordance with the predetermined set of call numbers, so that only authorized cordless terminals can set up calls via the base station; a private branch exchange wherein each of a given number of call numbers of the set of call numbers is assigned to only a single cordless terminal for identifying a special authorization; a private branch exchange wherein given call numbers of the set of call numbers are assigned to two or more cordless terminals; a private branch exchange wherein the subordinate control unit contains for each base station connected via an interface module one set of call numbers each assigned to one of the cordless terminals of a radio cell, so that in response to a broadcast message from the subordinate control unit to all base stations within the ranges of the radio cells of the private branch exchange, each cordless terminal can be reached via the terminal identification (roaming); and a private branch exchange wherein when a cordless terminal is leaving one radio cell and entering another, in response to a request from the cordless terminal, the subordinate control unit can switch an existing connection with a cordless terminal to the base station associated with the other radio cell.

BRIEF DESCRIPTION OF THE DRAWING

The following explains a configuration example by means of the drawing.

The FIGURE shows the structural design of a private branch exchange according to the invention.

BEST MODE FOR CARRYING OUT THE INVENTION

The private branch exchange WPABX according to the invention contains a number of interface modules configured I/F for connecting a number of wired terminals DE and two base stations BS, each serving one radio cell FZ. Each base station BS can be connected with a number of cordless terminals HS via an air interface. Of course, the private branch exchange also has an interface module I/F PSTN, which is configured as an interface for a public network.

Furthermore, a central control unit PABX-CPU is provided for call handling and service feature control in the private branch exchange, as well as a mobile-CPU control unit, which is subordinate to the central control unit PABX- CPU, for processing all call setup and switch-off messages for a specified set of call numbers assigned to the cordless terminals HS.

The central control unit PABX-CPU, the subordinate mobile-CPU, as well as all interface modules I/F and I/F PSTN, are connected to a bus system BUS, in order to exchange control messages between the control units, on the one hand, and to process call switching tasks, on the other.

The interface modules I/F shown in the FIGURE are preferably configured as ISDN-$S_0$ interfaces, so that all ISDN service features are also available for the cordless terminals HS.

However, an ISDN-DECT conversion takes place in the base stations so that the cordless terminals HS can operate according to the DECT-protocol, and utilize the service features established for mobile communications. For example, an ISDN-protocol that is being used may be 1TR6 of the German Federal Post Telekom system.

Thus, on the one hand, only ISDN-protocols are used, and on the other, all cordless terminals HS operating according to DECT may be used, regardless of the manufacturer.

A terminal identification is assigned to the set of call numbers, so that only authorized cordless terminals HS can make the connections via the respective base station BS.

On the one hand, a so-called 1:1 arrangement has been made, i.e. there is only a single terminal HS authorized to make connections through a single assigned call number. Such terminals may be provided for specially authorized persons, so that calls within the private branch exchanges can be made at any time from this terminal HS.

It is furthermore provided that a determined number of cordless terminals HS can telephone via a single assigned call number (Telepoint). In this way subscribers, who have only a wired terminal DE assigned to them, can also make wireless calls with this cordless terminal HS, in a somewhat restricted manner, since they do not all operate simultaneously.

For example, if the user of a cordless terminal HS now wishes to make a connection with a wired terminal DE of the private branch exchange WPABX, a call setup message is transmitted from the assigned base station BS and the corresponding interface module I/F to the bus system BUS. According to the invention, only the subordinate mobile-CPU control unit can access all call setup and switch-off messages sent by the interface module I/F assigned to the cordless subscribers. After receiving a call setup message, the subordinate mobile-CPU control unit sends a corresponding control message via the bus system BUS to the central control unit PABX-CPU, which is qualified to process the overriding call handling operation. The central control unit PABX-CPU then processes the desired connection order in the same manner as if the order had come from any subscriber. This has the advantage that an already existing private branch exchange control, like the central control unit PABX-CPU in this case, need not be changed in principle. The result is that the bus system performs a call setup to the wired terminal DE, in the well known manner.

Of course, each desired connection, e.g. to a public subscriber, is made in the corresponding manner, where a connection takes place via the public network interface module I/F PSTN.

Naturally, in the same way, i.e. without the intervention of the central control unit PABX-CPU, a cordless terminal HS can also access each individual service feature of the private branch exchange WPABX, because, according to the invention, the central control unit PABX-CPU can perform the service feature operation in the identical manner as for any other non-mobile terminal.

The private branch exchange WPABX according to the invention makes it furthermore possible for each cordless terminal HS to be accessed within the range of the radio cells FZ (roaming), based on the assigned set of call numbers in the subordinate mobile-CPU control unit. To that effect, the subordinate mobile-CPU control unit sends a radio message to all base stations BS, and the connection to the desired cordless terminal HS is established on the basis of the terminal identification.

Furthermore, a connection, which is controlled by the subordinate control unit, can be switched over when changing from one radio cell FZ to another radio cell FZ during an existing connection (handover), where this connection switch-over takes place from one base station to a base station assigned to the other radio cell, as a result of a request from the cordless terminal HS.

What is claimed is:

1. A private branch exchange (PABX) comprising:

a plurality of interface modules (I/F) configured for connecting a plurality of corded terminals (DE) by wire and for connecting at least one base station (BS) which serves a radio cell (FZ) and is connectable via an air interface to a plurality of cordless terminals (HS);

a central control unit (PABX CPU) for processing all call handling in the private branch exchange for the plurality of corded terminals (DE), including processing corded terminal call-setup and call-cleardown messages and corded terminal connection orders, and for further processing only a part of the call handling for the plurality of cordless terminals (HS) in response to a mobile control message signal, including processing all cordless terminal connection orders in a same manner as corded terminal connection orders, but not processing cordless terminal call-setup and call-cleardown messages;

a mobile control unit (mobile CPU) subordinate to the central control unit (PABX CPU) for processing all cordless terminal call-setup and call-cleardown messages for a predetermined set of call numbers assigned to the plurality of cordless terminals (HS), and for providing the mobile control message signal to the central control unit (PABX CPU); and a bus system (BUS) to which are connected the central control unit (PABX CPU), the mobile control unit (mobile CPU), and the interface modules (I/F) for exchanging control messages and executing switching tasks.

2. A private branch exchange as claimed in claim 1, wherein each of the plurality of interface modules (I/F) is an ISDN $S_0$ interface module (I/F) (ISDN=Integrated Services Digital Network) for connecting said at least one base station (BS) to make all ISDN service features available to the cordless terminals (HS) via the base station.

3. A private branch exchange as claimed in claim 2 wherein the base station (BS) connected to the ISDN $S_0$ interface module performs an ISDN-DECT protocol conversion (ISDN=Integrated Services Digital Network, DECT=Digital European Cordless Telephone), so that the cordless terminals (HS) connectable to the base station via the air interface are operable in accordance with DECT protocols.

4. A private branch exchange as claimed in claim 1, wherein the subordinate control unit (mobile CPU) controls an associated terminal identification in accordance with the predetermined set of call numbers, so that only authorized cordless terminals (HS) can set up calls via the base station (BS).

5. A private branch exchange as claimed in claim 4, wherein each of a given number of call numbers of the set of call numbers is assigned to only a single cordless terminal (HS) for identifying a special authorization.

6. A private branch exchange as claimed in claim 4, wherein given call numbers of the set of call numbers are assigned to two or more cordless terminals (HS).

7. A private branch exchange as claimed in claim 6, wherein the mobile control unit (mobile CPU) contains for each base station (BS) connected via an interface module (I/F) one set of call numbers each assigned to one of the cordless terminals of a radio cell, so that in response to a broadcast message from the mobile control unit (mobile CPU) to all base stations (BS) within ranges of radio cells of the private branch exchange, each cordless terminal (HS) can be reached via a roaming terminal identification.

8. A private branch exchange as claimed in claim 7, wherein, when a given cordless terminal (HS) is leaving one radio cell and entering another, in response to a request from the given cordless terminal (HS), the mobile control unit (mobile CPU) can switch an existing connection with the given cordless terminal (HS) to another base station (BS) associated with another radio cell.

9. A private branch exchange as claimed in claim 5, wherein the mobile control unit (mobile CPU) contains for each base station (BS) connected via an interface module (I/F) one set of call numbers each assigned to one of the cordless terminals (HS) of a radio cell, so that in response to a broadcast message from the mobile control unit (mobile CPU) to all base stations (BS) within ranges of radio cells of the private branch exchange, each cordless terminal (HS) can be reached via a roaming terminal identification.

10. A private branch exchange as claimed in claim 4, wherein the mobile control unit (mobile CPU) contains for each base station (BS) connected via an interface module (I/F) one set of call numbers each assigned to one of the cordless terminals (HS) of a radio cell, so that in response to a broadcast message from the mobile control unit (mobile CPU) to all base stations (BS) within ranges of radio cells of the private branch exchange, each cordless terminal (HS) can be reached via a roaming terminal identification.

11. A private branch exchange as claimed in claim 6, wherein, when a given cordless terminal (HS) is leaving one radio cell and entering another, in response to a request from the given cordless terminal (HS), the mobile control unit (mobile CPU) can switch an existing connection with the given cordless terminal (HS) to another base station (BS) associated with another radio cell.

12. A private branch exchange as claimed in claim 5, wherein, when a given cordless terminal (HS) is leaving one radio cell and entering another, in response to a request from the given cordless terminal (HS), the mobile control unit (mobile CPU) can switch an existing connection with the given cordless terminal (HS) to another base station (BS) associated with another radio cell.

13. A private branch exchange as claimed in claim 4, wherein, when a given cordless terminal (HS) is leaving one radio cell and entering another, in response to a request from the given cordless terminal (HS), the mobile control unit (mobile CPU) can switch an existing connection with the given cordless terminal (HS) to another base station (BS) associated with another radio cell.

* * * * *